United States Patent Office 3,370,483
Patented Feb. 27, 1968

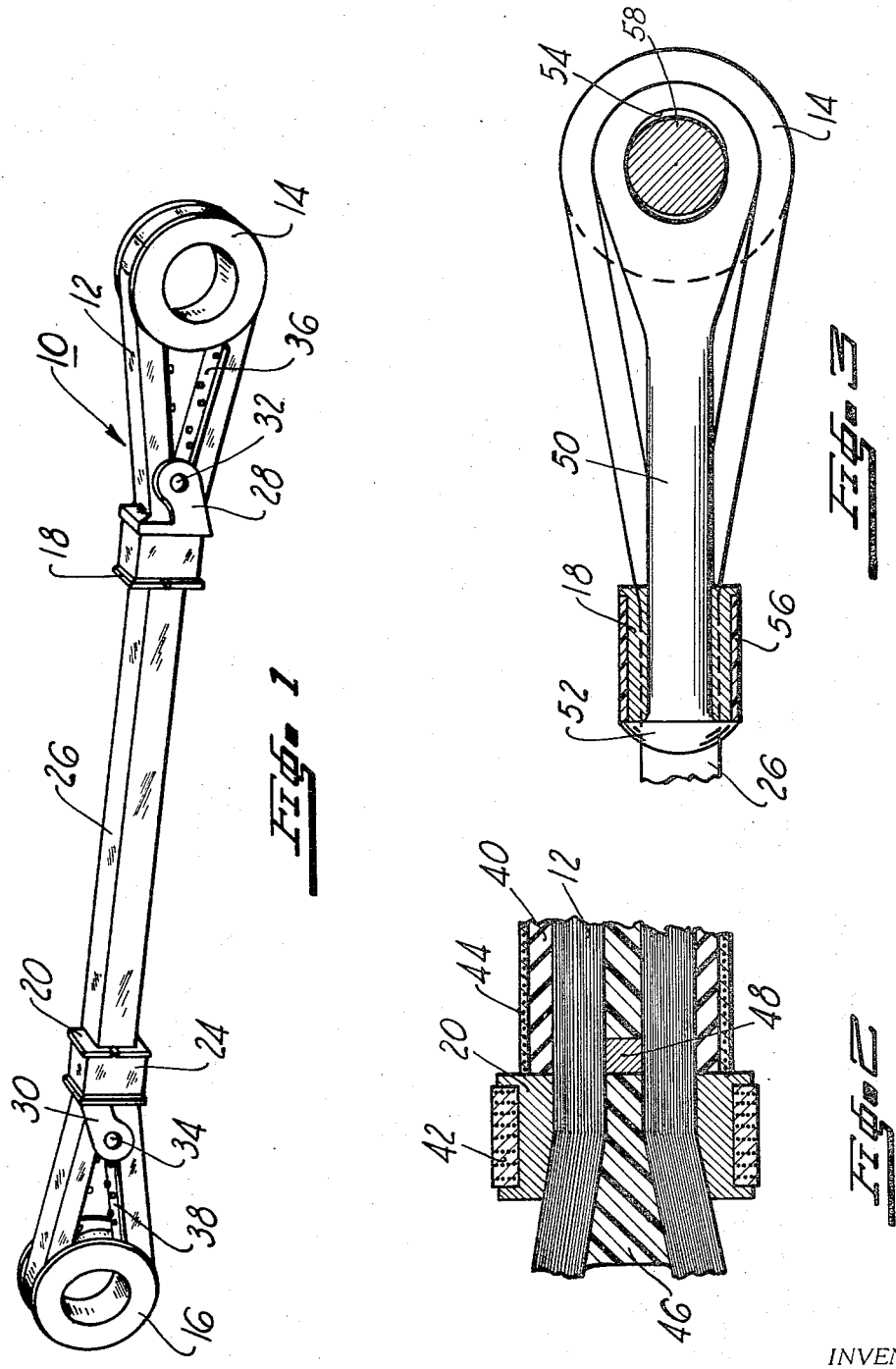

3,370,483
LAMINATED TENSION-TORSION TIE-BAR
Richard J. Ditlinger, South Bend, Ind., assignor to The Bendix Corporation, a corporation of Delaware
Filed Mar. 9, 1966, Ser. No. 532,989
5 Claims. (Cl. 74—579)

ABSTRACT OF THE DISCLOSURE

A tie-bar coupling, with means to draw the parallel side portions to abutting relationship at the axes of the coupling and said means having elements to prevent progressive type failure.

Summary

Couplings of the nature set forth by this invention are being utilized, for example, in connecting helicopter rotor arms to helicopter rotor blades as may be seen by the prior art patents bearing Patents Nos. 3,228,481 and 3,265,554 assigned to the common assignee of this invention. However in these prior art patents the couplings were designed to have spaced side portions, and this required the use of flexible adhesives to provide the desired torsional flexibility. Attempts to provide a more flexible coupling which allows the use of resins as well as elastomers to flexibly integrate the filaments of this type of coupling, such as is taught by the Patent No. 3,189,510 assigned also to the common assignee of this invention, have not been successful. This invention eliminates the problems observed in these attempts by preventing the unequal loading of circumferential wrappings drawing the side portions together.

This invention relates to a coupling for connecting structural members. More particularly, this invention relates to an improvement in a laminated filament wound coupling.

Tie-bars of the prior art design have been constructed to be generally of annular configuration with spaced parallel sides. Such a coupling is known to be a torsionally stiff member. It is a principal object of this invention to provide a torsionally flexible tie-bar.

It is a more particular object of this invention to provide a tie-bar with means for drawing the sides together between end fittings therefor in order to increase the flexibility thereof.

It is yet another object of this invention to provide the means for drawing the sides of the tie-bar together with still further means to maintain the location of the means so that they will not axially move toward the center of the tie-bar during the application of loads thereto.

Other objects and advantages of this invention will appear from the following description of the drawings in which:

FIGURE 1 is an isometric view of a tie-bar construction in accordance with the principles of this invention;

FIGURE 2 is a partial cross section of a tie-bar at the point where the sides are drawn together in accordance with another embodiment of this invention; and FIGURE 3 is a broken partially cross section plan view of yet another embodiment of a means to draw the sides of the tie-bar together in accordance with the principles of this invention.

With reference to FIGURE 1 there is shown a tie-bar 10 having an endless lamination of parallel, elastomeric encased filaments 12 wrapped around two end fittings 14 and 16. As the lamination of parallel filaments projects inwardly from each of the bushings 14 and 16, they are drawn together by a plurality of split rings 18 and 20 that are closed by a circumferential wrap of elastomeric encased parallel filaments 24. Between the rings 20 and 18 and the circumferential wraps thereabout, another circumferential wrap of similarly encased parallel filaments 26 is laid over the drawn together sides of the lamination 12. The rings 18 and 20 have trailing ears 28 and 30 that are affixed to the outward portions of each of the rings. At the outwardmost end of the ears 28 and 30 pins 32 and 34 affixed thereto project inwardly between the sides of the multiple layers of filament laminations 12. A wedge shaped plate assembly 36 and 38 having an apex thereof wrapped about the pins 32 and 34 is placed within the wedge cavity between the bushings 14 and 16 and the respective rings 18 and 20. Thus, the wedge shaped plate is retained between the end fittings 14 and 16 by the pin 32 extending between the ears 28, which extend toward the bushings above and below the laminations 12, will prevent its moving toward the end fittings whereas the angular relationship between the sides of the wedge shaped plate assembly and the laminations 12 will prevent its moving away from the end fitting.

Thus, it will be seen that any axial movement of the rings 18 and 20 towards each other will be resisted by the plates 36 and 38, and the rings will evenly load the circumferential filaments to preclude progressive type failures.

In another embodiment the sides of the multiple layer of filament laminations is enclosed with a compatible low-modulus plastic substance 40, as seen in FIGURE 2. In this structure, a circumferential wrap of parallel elastomeric encased filaments, as at 42, encloses the laminations about the rings. If desired, the circumferential wrap of filaments may be extended outwardly of the substance 40 as at 44. Furthermore, in some installations it is highly desirable to fill the cavity between the sides of the tie-bar laminations 12 with the low-modulus plastic substance, as at 46; and in so doing, a metal pin 48 with projections abutting the inner flanges of the split rings 18 and 20, one of which is shown, can be placed in position prior to the filling. This substance inside the link will preclude interaction between the inner layers of the two sides of the link to increase the service life.

Still yet another form which this invention may take is shown in FIGURE 3 wherein a plate 50 having a radial flange 52 abutting the inner surface of the ring 18 and a drilled opening 54 in its opposite end to overlie the opening through the end fitting 14 is held in place by a circumferential wrap 56, similar to those aforementioned.

Enclosing the elastomeric encased filaments 12 may comprise tapes that are wrapped around the end fittings to form the endless lamination which can be constructed in accordance with the same construction of U.S. Patent No. 3,189,510 assigned to the common assignee. However, it should be realized that the filaments may be other than the wire that is mentioned in this patent, as will be readily appreciated by those skilled in the art to which this invention relates. Thus, upon assembling this coupling to surrounding structure, as by means of pin 58, the rings 18 are located so that they cannot slip down toward the center of the coupling.

Having described a construction and modifications thereto employing the principles of my invention, I now wish to turn to the scope of protection sought by Letters Patent, as follows:

I claim:

1. A tie-bar having a plurality of layers of parallel filaments encased by an elastomer and wrapped around end bushings in an annular endless structural link, a means to draw the center region of the link together, said means comprising:

a pair of annular split rings around said link, one of said rings being located adjacent each of said bushings;

a means to hold each of said rings adjacent each of said bushings; and a layer of circumferential wraps of elastomer encased parallel filaments around said rings and said link between said rings to form a solid center section between said bushings, said rings serve to evenly stress the circumferential wraps to prevent progressive-type failure.

2. A tie-bar according to claim 1 wherein said means holding each of said rings includes trailing ears connected to each of said rings extending toward said bushings, a wedge plate assembly between each of said bushings and said rings, said plate assembly having an apex portion passing around a pin means affixed to said ears.

3. A tie-bar according to claim 1 wherein said means holding each of said rings is characterized as a low-modulus plastic compatible with said elastomer and bonded to said link between facing surfaces of said rings with said circumferential wrap thereover.

4. A tie-bar according to claim 3 and further comprising a metal pin between the sides of said link internally thereof with projections abutting said facing surfaces of said rings, and a low-modulus plastic filling the cavity between the inner sides of said tie-bar on both sides of said pin and bonded to said link.

5. A tie-bar according to claim 1 wherein said means holding each of said rings adjacent each of said bushings includes a plate having a flange at one end, said flange being connected to the inner side of said ring, said plate having an opening at the other end in registry with an opening through said end bushing, a pin connecting the ends of said tie-bar to surrounding structure, said pin extending through the openings of said plate and said bushing, whereby the pin prevents axial movement of said ring, said circumferential wrap enclosing said link and rings also enclosing the portion of said plate affixed to said ring.

References Cited

UNITED STATES PATENTS

| 421,120 | 2/1890 | Young | 287—81 |
| 2,495,951 | 1/1950 | Von Wehrden | 287—81 |
| 3,228,481 | 1/1966 | Eldred | 170—160.53 |
| 3,265,554 | 8/1966 | Eldred. | |
| 3,279,278 | 10/1966 | Eldred | 74—579 |

OTHELL M. SIMPSON, *Primary Examiner.*

WILLIAM FELDMAN, *Examiner.*

G. WEIDENFELD, *Assistant Examiner.*